Aug. 5, 1952 — R. R. MUELLER — 2,605,832

TIMER FOR TOASTERS

Filed Dec. 29, 1948 — 3 Sheets-Sheet 1

Inventor:
Rudolph Robert Mueller

Aug. 5, 1952          R. R. MUELLER          2,605,832

TIMER FOR TOASTERS

Filed Dec. 29, 1948          3 Sheets-Sheet 2

Inventor:
Rudolph Robert Mueller

Aug. 5, 1952  R. R. MUELLER  2,605,832
TIMER FOR TOASTERS
Filed Dec. 29, 1948  3 Sheets-Sheet 3

Inventor:
Rudolph Robert Mueller
by Thos. A. Lowing Jr.
Atty.

Patented Aug. 5, 1952

2,605,832

UNITED STATES PATENT OFFICE 2,605,832

TIMER FOR TOASTERS

Rudolph Robert Mueller, Marion, Ind.

Application December 29, 1948, Serial No. 67,938

8 Claims. (Cl. 161—1)

This invention relates to improvements in toasters, and the like. The present improvements have been devised especially for use in toasters for household and similar locations, but it will presently appear that said improvements may also be advantageously used in connection with toasters of larger size, such as are intended for restaurants, and other commecrial uses. Conveniently, however, I have illustrated and shall describe these improvements in a household toaster, but in so doing I wish it understood that I do not thereby intend to limit myself, except as I may do so in the claims to follow.

The features of invention herein disclosed relate primarily to improved means to pre-determine and pre-set the toasting operation so that toast of selected degree of toasting will be regularly produced as pre-selected by the operator. For the production of satisfactory toast experience has shown that the heating elements should be maintained at a temperature which has been well established; and the degree of toasting which will then be produced by these heating elements at that temperature will depend on the time interval during which the toasting slice or slices are subjected to the toasting temperature. Production of relatively "dark" toast requires that the toasting operation shall be maintained for a longer interval than for production of "light" toast, and vice versa, it being assumed that the toaster has been in operation for an interval of sufficient duration to bring its various parts to a fairly constant operating temperature. Once that operating condition has been attained the "darkness" of the toast produced by the subsequent toasting operations (while hot) will depend almost exclusively on the time intervals of such subsequent toasting operations. Thus, when the toaster has once been brought to is normal operating heat by one or two toasting operations, the subsequent toasting operations will in each case produce toast whose darkness will depend almost exclusively on the time intervals of such subsequent toasting operations.

It is here mentioned that at the conclusion of each toasting operation the current is shut off from the heating elements, and remains shut off until the subsequent toasting operation commences, so that these heating elements themselves are allowed to cool considerably between successive toasting operations; but during the first one or two operations the body portions of the toaster will have become heated to whatever degree will be caused by the normal toasting operations, and these body portions of the toaster are of considerable heat absorbing capacity; and accordingly they do not cool off appreciably between normally conducted successive toasting operations but they maintain their "operating temperature" until the use of the utensil has been discontinued for a considerable interval of time, as for example, at conclusion of a breakfast. For the above reasons it will be found that in order to produce toast of a pre-selected "darkness" the time interval of toasting during the first one or two operations should be longer than the time intervals for production of that degree of darkness of toast during the succeeding operations. Thereafter all succeeding operations should be normally conducted with whatever time interval has been found to be correct for production of toast of the selected degree of darkness.

Since household toasters are generally used during or immediately before meals, and since said toasters are used more or less continuously during such meal operations, it will be seen that once the normal operating temperature of the body of the toaster has been attained said temperature of the body will be retained until the mealtime use of the toaster has been completed. Also, that after completion of use of the toasting operations for such meal, the toaster will cool off completely prior to commencement of the next series of toasting operations. Thus, in all normal operations of such toaster, and for the production of toast of uniformly selected darkness, the time interval of toasting for the first one or two operations should be prolonged (as compared to the time intervals for a fully heated toaster) somewhat, after which all subsequent toasting operations may be conducted for the time interval which has been determined correct for such degree of darkness of the produced toast. This principle is true for all degrees of darkness of the produced toast which may be pre-selected. In general, therefore, it may be stated that, for the production of a pre-selected darkness of toast the time interval of toasting should be longer when starting with a cool toaster than when starting with a hot toaster; and it may also be stated that the amount of this extra toasting time required when starting with a "cold" toaster (as compared to the time required when starting with a "hot" toaster) is substantially constant, regardless of the degree of darkness which may be pre-selected. This is true for all practical operations, and for all practical determinations of "darkness" of the toast as determined by the eye in usual household operations.

It is a prime object of the present invention to make provision for ensuring a prolonged toasting interval for starting with a cold toaster, and for production of a pre-selected degree of darkness of the toast, such provision being of a manual nature, the arrangement being such that for production of the pre-selected degree of darkness of toast the operator will pre-set a button or other manually movable element to the "cold" position, leaving it in such position during the first toasting operation; and the arrangement being such that when the toaster has become heated, and after the completion of the first operation, the operator will re-set said button or other manually operable element to the "hot" position, so that the toasting operation will be properly conducted for production of such pre-selected degree of darkness of toast thereafter, as long as the toaster remains hot.

Since the degree of darkness which will be produced (assuming that the toaster is hot) depends on the time interval of the toasting operation, it follows that by making provision for adjustment of such time interval according to the degree of darkness desired the toaster may be pre-set for production of such degree of darkness in successive operations, or that the degree of darkness may be changed from time to time as desired to meet changing specifications. A convenient measure of the darkness of toast which will be produced is a scale graduated with color plates corresponding to the colors which will be produced. I have, as one feature of the present invention, provided a color scale or "colorgraph" carrying plaques or sections which become visible through an escutcheon plate or through an opening of the base or housing of the toaster, such colored sections becoming successively visible as the manually adjustable element is moved to successive positions. This "colorgraph" element is operably connected to the manual means whereby the time interval of toasting is adjusted, so that the color which is visible through such escutcheon plate or through such opening is that color which will be produced (darkness) by the toasting operation of duration which has been thus pre-set manually by the operator. By moving the manual element to successive positions the time interval of toasting is successively brought to different sustained intervals of toasting. When viewing the "colorgraph" through an opening of fixed location it is evident that a given color or darkness will be visible for one time interval position, another color or darkness will be visible for another time interval position, still another color or darkness will be visible for the corresponding time interval position, etc. It will also be evident that by properly locating the opening through which such visibility is effected the color or darkness thus made visible through such opening can be made the same as that color of toast which will be produced by an operation of the corresponding time interval, for the condition of starting "cold" or "hot," depending on what portion of the "colorgraph" is visible through such opening. For example, by locating the opening through which visibility is effected at a given position, the color or darkness of the "colorgraph" which will be exposed will correspond to the time interval of toasting when starting "cold," to produce toast of such darkness as is exposed through such opening. When the toaster has become heated a shorter time interval will be required for production of such darkness of toast. Accordingly the location of the opening should be shifted so that by making a corresponding shift of the time interval control element to ensure visibility of the same color or darkness through the opening in such shifted opening position, the time interval will have been reduced by such amount as will still produce the desired color or darkness of toast, starting with a hot toaster instead of a cold toaster. In other words, by making provision for shift of the location of opening through which the colorgraph is visible, and also by correspondingly shifting the colorgraph itself (and the time interval control element which is combined with such colorgraph), the time interval will be correct for production of toast of the desired darkness as shown by the colorgraph, and when starting with a hot toaster instead of a cold toaster. Thus it is possible to pre-set the toaster to produce a selected degree of darkness of the toast when using either a cold or a hot toaster (at the start of the operation); and thus, also, it is possible to produce toast of pre-selected darkness when starting with a cold toaster, and to also produce toast of that same degree of darkness after the toaster has become hot, and merely by a re-setting of the manual control devices to still show that same indication on the colorgraph scale as was originally selected.

Instead of providing the "colorgraph" scale with a series of plaques or sections of colors or shadings of darkness corresponding to the darkness of the toast which will be produced, said scale may be provided with numerals or other indicia corresponding to the several degrees of darkness of toast to be produced; or combination indicia may be provided, the scale carrying colored or shaded sections, and also numerals or other suitable indicia. Such numerals or other indicia may be advantageous for use when it is desired to instruct another operator to produce toast of desired characteristics, and when it is difficult to define exactly the desired degree of darkness by a color name or style. In such case it is definitely possible to designate a specific darkness by such a designation as "No. 1" or "No. 3," etc., thus enabling the definite designation of the darkness desired. By using both such indicia together, both the colorgraph scale and the numerals or other definite indicia, it is possible for the user to select, by color, that darkness which he wishes to produce, and then to inform another operator definitely of such darkness by statement of the corresponding numerical designation or indicia.

Generally speaking I have provided a movable cam element which can be set into various positions corresponding to selected toasting intervals. For production of a prescribed darkness of toast the interval required will depend on whether the toasting operation was commenced with a cold or a hot toaster. When commencing with a hot toaster there is required a shorter interval than when commencing with a cold toaster. This cam element serves to limit the setting movement of the setting arm, such setting movement being thus possible between the two extremes of time corresponding to lightest toast when commencing with a hot toaster on the one hand, and darkest toast when commencing with a cold toaster on the other hand. Between these two extremes of time intervals this cam element will provide for settings of such a number of variations of darkness of the toast as may be selected in the design of the implement. Corresponding to this cam element there is provided an indicator which is visible to the operator and which shows the position to which the cam element has been pre-set, corresponding to the selected darkness of toast, and starting either cold or hot. In order to ensure that the operator shall read only that portion of this indicator corresponding to the set position of the cam I have provided a window or escutcheon plate which defines that portion of the entire indicator which shall be read. The various degrees of darkness are shown on the indicator in successive positions. The cam is so formed (in comparison to this indicator) that when viewing the indicator through the window, and as successive degrees of darkness are indicated through such window, the cam will stop the setting arm at the positions which correspond to such degrees of darkness of toast which will be produced by the time intervals corresponding to such indications, and for either the cold or hot condition. When starting with the hot condition the cam position which will be produced for a given indication of a selected darkness must be different from that cam setting which would be produced for an indication of that selected darkness for the cold condition. Thus there must be established and retained a relationship between the indicator and the cam such that for the change from cold to hot condition the cam position, corresponding to indication of such degree of darkness, will change by an amount which will effect proper correction of the setting of the timer arm to produce that selected degree of darkness for the hot condition instead of the cold condition. Of course a contrary correction must be made when starting hot instead of cold.

I have herein disclosed a very simple arrangement in which the cam element and the indicator are directly connected together so that they both move by the same amounts during the settings from one indicating position to another. I have also so formed this cam element that when passing from one darkness indication to the next the setting of the timer arm will be correspondingly changed to ensure production of the newly selected darkness of toast. In one form of the invention herein disclosed and illustrated the position of the window may be changed between two positions corresponding to cold and hot, so that the cam and indicator element will have to be moved to a new position in order to view the selected darkness indication, such change or move of the cam and indicator element being proper to effect the necessary change in stopping position of the timer setting arm.

According to another embodiment of the invention as herein illustrated and described I have provided the indicator with two indicating positions corresponding to each selected degree of darkness of the toast, one for cold and another for hot; and in such case use may be made of a window of fixed location, and of size to view only one of these indicating positions at a time.

In connection with the embodiment of the invention just mentioned I have also provided said indicator with showings of the successive degrees of darkness for either the cold or the hot condition, so that the operator need only shift the indicator from the cold showing of a selected darkness to the hot showing of that degree of darkness in order to effect the desired correction.

When use is made of an arrangement in which the change from cold to hot toaster is made by a separate button or knob from that by which the indicator is moved these buttons or knobs may be made entirely independent of each other; or they may be interconnected in such manner that when a selected showing of degree of darkness is given by the indicator, the cold or hot button may then be shifted between its two positions, and the proper corrections of the cam element (and the window) will be made without need of making a further corrective movement of the darkness selector button.

The cam and indicator element is conveniently made of such form and proportions that all corrections and changes are effected by a single rotation or slightly less than a single rotation of a rotating element. By this means use may be made of a rotary cam element whose form is such that the successive corrected positions of the setting arm correspond to the selected degrees of darkness within the whole range desired. When using such an arrangement I have provided means to limit the rotary movement of such combined element, so that such movement will be limited at the lightest toast position (hot) in one direction, and at the darkest toast (cold) in the other direction.

The toaster arrangement herein disclosed is one in which the timer element (which may be of a well known type and construction) includes a rock arm. This rock arm is initially moved or rocked to its position as limited by the setting arm, and the movement of such setting arm (from its initial or non-moved position) is limited by the position of the cam element previously referred to herein. This form of timer is one in which the time required for such timer to exhaust its movement and return to its initial position depends on the amount of setting rocking movement imparted to such timer arm. This timer is also one of such construction that when the rock arm of the timer has been set over to a selected timing position, said arm may be intentionally forced back to its initial or non-moved position prior to its normal return to such position by lapse of time, thus terminating the timing count and stopping the toasting operation by opening of the heating element circuit, and also causing the slice carrier or carriers to move to the delivery position earlier than had been intended originally, and with the toast brought to a degree of darkness less than had been originally intended and pre-set. I have thus provided a combination of parts in which the operator may, at any time, intentionally terminate the toasting operation prior to the normal and automatic termination thereof, corresponding to the degree of darkness to which the indicator was originally set.

In connection with the foregoing, and for other reasons, I have combined the features of invention heretofore referred to with a form or toaster which is provided with a transparent enclosure, and of such arrangement that the condition of the slice or slices being toasted may be continuously watched during the toasting operation. Such forms of transparent enclosure toasters are shown in my co-pending applications, Serial Nos. 744,090, filed April 26, 1947, and 787,652, filed November 24, 1947, now Patent No. 2,595,283. By so combining the inventive features herein disclosed with either or both of the toaster forms disclosed in said earlier filed cases it is possible to not only pre-set the toaster to deliver toast slices of pre-selected darkness, but also it is possible to watch the progress of the toasting operation, and to stop the toasting prior to the lapse of the time interval to which the indicator had been set, and to deliver the toast with a lighter color than had been originally intended. In other words, by use of this transparent enclosure arrangement it is possible to produce and deliver toast of whatever degree of darkness may be desired as viewed by the operator; or it is possible to produce and deliver a prescribed darkness of the toast as a fully automatic operation.

A further feature of the present invention relates to the provision of means to introduce the slices into toasting position, and to thereafter deliver said slices after being toasted, by horizontal movements as distinguished from vertical movements. In connection with this feature I have herein shown toasters of forms in which the slices are supported during the toasting operation in horizontal position as well as in vertical position, the movements, however, being in each case in substantially horizontal direction.

Another feature of the invention relates to improvements in the toaster which will enable the production of a superior quality of toast from the slices as compared to previous toasters. During the toasting operation the surfaces of the slice are "toasted" and the interior body of the slice is subjected to the applied heat reaching such interior portions. This heating of the interior or body portion of the slice necessary results in vaporization of the moisture thereof, and expulsion of such moisture from the texture of the bread slice. Also, considerable moisture is thus vaporized which had previously been in a "hydrated" or "crystallization" condition, so that the total moisture thus expelled from the slice is considerable in amount. When such toasting operation proceeds within a closed space, and a space in which the atmosphere is substantially stagnant said moisture, although being placed in the vapor phase, is still retained within the slice or in close proximity thereto during the toasting operation. Accordingly, when said toasting operation has been completed this moisture, being retained within or close to the slice, is largely condensed within the body of the slice as the same cools, with the result that a toasted slice is produced which is provided with toasted surfaces, but whose interior or body is soggy and not flaky, and such toast is frequently of a non-appetizing quality.

I have provided a toaster construction such that during the toasting operation the interior of the toaster is continuously vented and subjected to a natural flow current of atmosphere which continually carries off the moisture from the toasting slice. Thus there is no accumulation of water vapor within the toaster, and around the toasting slice, and when the toasting operation has been completed, and cooling of the slice commences, no condensation of such water vapor on and within the body of the slice can occur, but the vapor which had been produced has been carried away from the proximity of the slice.

At this point I wish to mention that I have herein disclosed a form of toaster in which the slice is supported in substantially horizontal planar position during the toasting operation, said slice being afterwards delivered by movement in a horizontal direction. The heating elements are supported above and below such slice, and at such spacings as have been found proper, with respect to both the top and bottom faces of the slice. I have also provided an enclosure for the slice carrier or carriers and for the heating elements, so that during the toasting operation the heating elements and the toasting slice are continuously protected against uncontrolled movements of air currents, and so that the heating and ventilating conditions are at all times subject to control for production of a toast having pre-known characteristics, and so that the vaporization and removal of the moisture will take place under controlled conditions. This enclosure is provided with an opening through which the slices are originally introduced, and through which the toasted slices are afterwards delivered. This opening is of large size, and is formed in one of the vertical walls of the enclosure, or is formed by complete elimination of one of said walls. Thus, although the heating elements and the toasting slice or slices are adequately protected from uncontrolled air currents during the toasting operation, still this large opening in a vertical wall serves to allow free exit of the vaporized moisture from the toasting slice, and under controlled conditions. I then preferably also provide, in the wall opposite to such large opening, a vent opening, close to or at the bottom of the toasting chamber. Such vent opening may comprise a horizontally extending slot in such opposing wall, or at the lower edge of the enclosure opposite to the large opening, and which slot is formed just above the top surface of the base on which the enclosure is set.

Such ventilating arrangement, comprising the large opening in one vertical wall, or the elimination of such wall, combined with the inlet opening or slot at or near the lower edge of the opposite wall, ensures a natural flow of air into and through the interior of the enclosure during the toasting operation, and under controlled conditions, so that a greatly improved toast product is produced. This improved toast product is one in which the surfaces of the slice are well toasted and in which the body or interior portions of the slice are of a flaky nature, and more or less dried out, but not hardened. In fact, such improved toast is readily cut through by the teeth when biting through such a toasted slice, and there is no tendency for the body of the slice to remain uncut, as is frequently the case with toast produced by previously and well known toasting operations.

The foregoing improved toasting operation is also enhanced by the fact that the slices are retained in horizontal position during the toasting operation and within the enclosure. The horizontal slice or slices then serve as horizontal baffles which distribute the current of air flowing in through the low and slotted inlet, and up through the heating elements, and around the slice or slices, with horizontal component of movement towards the opposite large opening through which such air is finally delivered from the interior of such enclosure. This air current movement continues during the entire toasting operation, and is thus definitely differentiated from arrangements in which no such continuous air current movement occurs during the entire toasting operation, but only at conclusion of the toasting when an enclosure is opened to remove the completed toast. Such arrangement is productive of a definitely improved form of toast product. Such improved toast product is dehumidified in a uniform manner and is of a uniformly dehumidified character.

The toasting of the slice surfaces is produced largely by radiant heat. The reflection of heat from the interior surfaces of the enclosure enters largely into this toasting action. I have found that the formation of such enclosure largely or entirely of transparent material such as glass or plastic also improves this toasting action.

Thus, the provision of a substantially wholly transparent enclosure not only provides the visibility to which reference is frequently made herein, but also influences the toasting operation in a favorable manner.

I have also found that by the continuous ventilation feature already referred to, there is no deposition of moisture on the surfaces of the enclosure, so said enclosure remains at all times clear and unfogged, and clear vision is possible at all times through said enclosure to observe the toasting operations as they proceed within the enclosure.

Sometimes I provide a crumb tray in the lower portion of the toaster and below the lowermost horizontally carried slice. Such crumb tray when provided, or the upper surface of the base section when such a crumb tray is not present, constitutes a reflecting surface from which heat from the lowermost heating element is reflected back and upwardly against the bottom surface of the lowermost slice. Preferably such crumb tray, or the base section's upper surface, is formed of aluminum or other metal whose reflecting surface will not appreciably change over a considerable period of time, and after many toasting operations, so that the amount of such heat reflection will not change appreciably for a long time. Thus the originally designed toasting characteristics of the toaster will remain unchanged over a long life of operation.

It is a further object of the present invention to provide a very simple and rugged form of mechanism for incorporating the features of the present invention, and also a form of mechanism which can be very cheaply manufactured and incorporated in the toaster structure.

Other objects and uses of the invention will appear from a detailed description of the same, which consists in the features of construction and combinations of parts hereinafter described and claimed.

Figures 1, 2, 4:
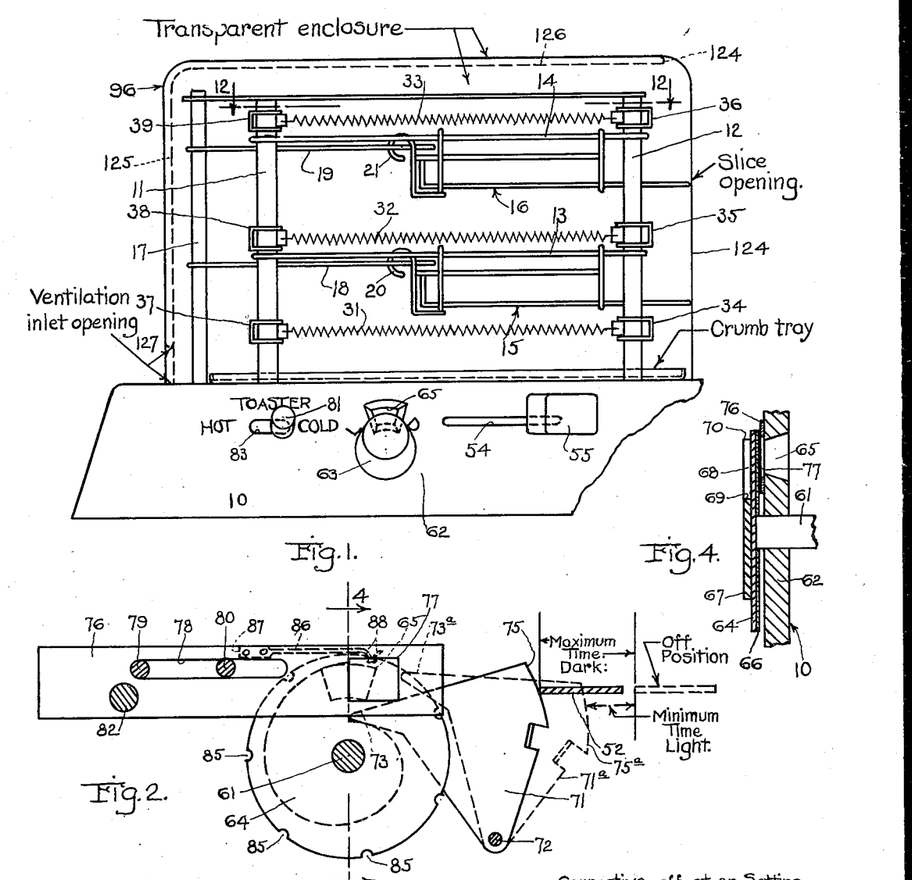
Figure 1 shows a side elevation of a typical toaster embodying the features of the present invention; said toaster being of the general form disclosed in said earlier application, Serial No. 787,652; and the lower right-hand corner of the toaster is broken away to reduce the size of the figure; and in this figure the setting arm is shown at its normal or initial or non-operated position.
Figure 2 shows, on enlarged scale as compared to Figure 1, a fragmentary section taken substantially on the line 2—2 of Figure 5, looking in the direction of the arrows; and this figure shows the colorgraph plate or scale, and the cam, in their position for maximum time interval, and the follower plate in corresponding position, and also shows, by dotted lines, the position of the follower plate for the position of the colorgraph and the cam for the condition of minimum time interval; and in this figure the opening or window selector plate is shown in its position corresponding to "cold" toaster so as to expose the selected shade or color indication when the cam and the follower plate are in correct position to produce toast of that selected shade with a "cold" toaster.
Figure 4 shows a cross-section taken on the line 4—4 of Figure 2, looking in the direction of the arrows.

In the drawings I have chosen to illustrate the features of the present invention in a toaster of the general type shown in said co-pending application, Serial No. 787,652, but such illustration is merely by way of example, except as I may limit myself in the claims to follow. This illustrated toaster includes the base section 10, from which there extend the vertical posts 11 and 12 (corresponding other posts being directly behind the posts 11 and 12); and the horizontal rails 13 and 14 extend between these posts 11 and 12 (corresponding other rails extending between the hidden posts). The two slice carriers 15 and 16 are slidably mounted on the rails 13 and 14 (and on the hidden rails), these slice carriers being conveniently formed of wire and being hung on the rails as shown in Figure 1. This form of toaster also includes the vertical rock shaft 17 behind the location of the posts and the rails and the slice carriers. This rock shaft extends through the top of the base section and into the space within said base, being suitably journalled for rocking movement. This rock shaft carries the curved or cam shaped arms 18 and 19 which engage with corresponding loops 20 and 21 of the slice carriers, so that rocking movements of the rock shaft are translated into back and forth reciprocating movements of the slice carriers. A spring 22 located within the base section has one end connected to the lower end of the rock shaft 17 and its other end connected to the base section, so that this spring tends at all times to rock the shaft in direction to so swing the arms 18 and 19 as to move the slice carriers in the delivery direction, that is, towards the right in Figure 1.

The lower end of this rock shaft also carries the plate 23 which rocks back and forth with said shaft. This plate is provided with a notch 24 and a trigger 25 is pivotally connected to said plate. There is an arm 26 pivoted to the base section at the point 27. This arm is provided with a lug 28 and a spring 29 has one end reacting against said arm 26, and its other end reacting against a pin 30 carried by the base section, so that said spring tends to rock the arm clock-wise when viewed as in Figure 5. Thus the lug 28 of said arm rides against the edge of the plate 23. When said plate (and the shaft 17) are rocked clockwise against the force of the spring 22 (in Figure 5), such rocking carries the arms 18 and 19 in direction to move the slice carriers leftwardly (in Figure 1), thus bringing the slice carriers into toasting position, and when such position is reached the lug 28 of the arm 26 will snap into the notch 24 of the plate 23, thus locking the plate, rock shaft, and slice carriers in such position, and against the force of the spring 22. On the other hand by rocking the arm 26 against the spring 29 the lug 28 will be disengaged from the notch 24, and the spring 22 will suddenly rock the plate 23, the rock shaft 17, and the arms 18 and 19 in direction to suddenly move the slice carriers towards the right in Figure 1, thus delivering the toasted slices.

Figures 5, 8:
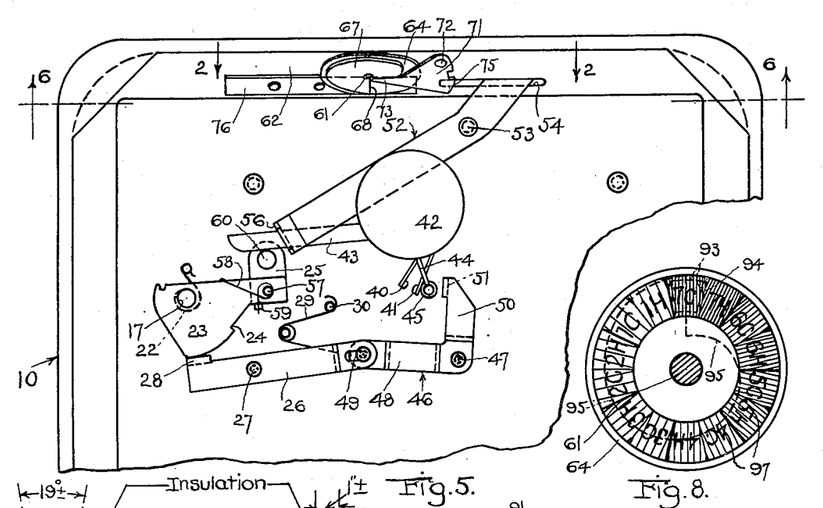
Figure 5 shows a bottom view of the toaster of Figures 1, 2, 3 and 4, and it reveals the timer, the various levers, and the relation of the various parts to each other; and in this figure the parts are shown in their initial or un-set position, and prior to setting the setting arm to position for production of toast; and a portion of the structure is broken away in this figure.
Figure 8 shows a modified form of indicator disk in which there are provided two adjacent positions for each degree of toast darkness, one for commencing the toasting operation with a cold toaster, and the other for starting the toasting operation with a hot toaster, a single and fixed window position being provided in connection with this indicator disk, and the two indicator positions or segments for each degree of darkness being provided with indicia for indicating cold and hot start, respectively.

Suitable heating elements 31, 32, and 33 are carried by the posts 11 and 12 (and the hidden posts) or by suitable bars 34, 35, 36, 37, 38 and 39 carried by said posts. These heating elements are of conventional form and are of proper proportions so that when electrified they supply the heat and temperature needed to toast the slices carried by the carriers 15 and 16 already referred to. These heating elements are connected into a circuit, and the contacts 40 and 41 shown in Figure 5 constitute a portion of said circuit. Upon bringing these contacts together said circuit is closed to supply current to the heating elements, and upon separating said contacts, as shown in Figure 5, said circuit is opened, and the current supply to the heating elements is discontinued.

There is a timer 42 carried by the base section. This timer may be of conventional form, being provided with a gear train, a main spring, an escapement device, and such supports for these parts as will enable said timer to count time in well understood manner. This timer includes an arm 43 which may be rocked in counter-clockwise direction to wind the spring, and set the timer into condition for time counting. The timer also includes an arm 44 which is rocked slightly in clock-wise direction at the beginning of the counter-clockwise rocking of the arm 43, and further counter-clockwise rocking of the arm 43 leaves the arm 44 in such slightly rocked condition, and with the arm 44 latched in such moved position. This arm 44 carries the insulating roller 45 which engages the contact 41, or the arm carrying said contact, so that when the arm 44 is thus slightly rocked clock-wise the two contacts are brought together and the circuit is closed for supply of current to the heating elements. The timer arrangement is also such that said arm 44 remains in latched condition, with the contacts together, until just prior to a full return of the arm 43 at conclusion of a time counting operation. Just prior to conclusion of the time count operation this arm 44 is unlatched, and the contact 41 is permitted to swing suddenly towards the right, thus opening the heating element supply circuit suddenly at conclusion of the time count interval.

This timer is also so arranged that the time interval or count which will be counted prior to opening of the heating element circuit is dependent on the amount by which the arm 43 was originally swung in counterclockwise direction. This arrangement is therefore such that for a short time interval or count the arm 43 is rocked a less amount in counterclockwise direction than it is rocked for a longer time interval count. Thus the time interval during which the contacts 40 and 41 will remain closed together will depend on the amount of rocking movement originally delivered to the arm 43. Thus, the amount of rock originally delivered to the arm 43 will determine the time interval of the toasting operation effected by such rock of said arm.

There is a bell-crank 46 pivoted to the base section at the point 47. The arm 48 of this bell-crank is connected to the arm 26 by a pin and slot connection 49 so that as the arm 26 rocks clockwise to latch by engagement of the lug 28 into the notch 24 the bell-crank 46 rocks counter-clockwise. The arm 50 of this bell-crank carries a lug 51 in position to be engaged by the insulating roller 45 of the arm 44 as said arm is released at conclusion of the time count. Thus, at conclusion of the time count the bell-crank 46 is rocked clockwise, thus rocking the arm 26 counterclockwise, and disengaging the lug 28 from the notch 24, and freeing the plate 23 and rock shaft 17 for sudden movement under the force of the spring 22, and causing the slice carriers to be suddenly projected towards the right in Figure 1 for delivery of the toasted slices.

The aforesaid co-pending application, Serial No. 787,652 discloses arrangements similar in principle to the arrangement hereinbefore disclosed, as far as hereinbefore described. At this point I wish to state that I have thus described a typical timer arrangement as applied to the toaster, by way of illustration, and to show an operable device, with which the presently to be described improvements are or may be combined and used, and that I do not limit my present improvements to such timer arrangement, except as I may do so in the claims to follow.

There is an arm 52 pivoted to the base section at the point 53. This arm extends through a slot 54 in one wall of the base section and the projecting end portion of this arm is conveniently provided with a finger piece 55 by which the arm may be rocked in the "setting" operation. This arm is the "setting" arm by which the toasting operation is instituted as will presently appear. That portion of the arm 52 at the opposite side of the pivotal point 53 is provided with a forked lug 56 which engages the arm 43. The arrangement is such that upon shifting the finger piece 55 to the left (in Figures 1 and 5) the arm 52 is rocked counterclockwise (in Figure 5), thus also rocking the arm 43 counterclockwise, being the setting direction of movement.

The trigger 25 already referred to, is pivotally connected to the plate 23 by the pivot 57. A light spring 58 tends to rock this trigger clockwise until limited by the small lug 59. Thus said trigger may yield in counterclockwise rotating direction, but cannot rotate clockwise from the position as shown in Figure 5. This trigger also carries a stud 69 which will be engaged by the end portion of the arm 43 during counterclockwise rock of said arm in the setting operation. The arrangement is such that for all amounts of rock of said arm 43 during setting operations (even for the smallest time count operations), the plate 23 will be rocked sufficiently to ensure engagement of the lug 28 with the notch 24 so as to ensure sufficient rock of the shaft 17 to draw the slice carriers fully to the left and into toasting position, and to ensure latching of the plate 23 (and rock shaft 17) in such position during the duration of the toasting interval. The form and size of the arm 43 are also such that when such latching of the plate 23 has occurred, the end of the arm 43 may move past the stud 60 for a further distance dictated by the total amount of swing corresponding to the amount of movement of the finger piece 55 and arm 52 as required by the time interval selected for the toasting operation in question. Thus, for a long toasting operation (to produce very dark toast) said arm 52 may swing considerably beyond the latching position of the plate 23, being considerably beyond the point of travel of the end of the arm 43 beyond the trigger stud 60.

Since the plate 23 (and the trigger 25 carried by it) have been latched in their fully rocked clockwise position, they will remain in such position as the arm 43 moves slowly in clockwise direction, and said arm must move past the position of the trigger in order to carry the timing operation to its conclusion point at which the arm 44 is released, with corresponding release of the bell-crank 46, and disengagement of the lug 28 from the notch 24. The form of the trigger 25 is such as to allow such returning movement of the arm 43 to occur, to carry said arm back to its position beyond the trigger stud 60. Then, when the plate 23 is released and swings suddenly in counterclockwise direction, the trigger and the stud will move to the position shown in Figure 5, with said stud behind or below the end portion of the arm 43 as shown in said figure, and ready for another operation.

There is a rock shaft or stud 61 pivoted through the flange 62 of the base section. The outer end of this stud is provided with the finger piece or button 63 by which said stud may be conveniently rocked to a selected position. The inner end of this stud carries the disk 64 whose front face (towards the inner face of the base section flange 62) is provided with suitable indicia or colorgraph shadings as will be presently explained. There is provided a window or escutcheon opening 65 in the base section flange, through which window the face of the disk 64 is visible as will be evident from examination of several of the figures. Thus the rocked position of this disk is revealed by examination through the window. The front face of said disk is shown, in Figure 4, as being provided with the sheet or layer 66 which carries the colorgraph shadings, and/or other indicia, such as the numerals already referred to.

Figure 3:
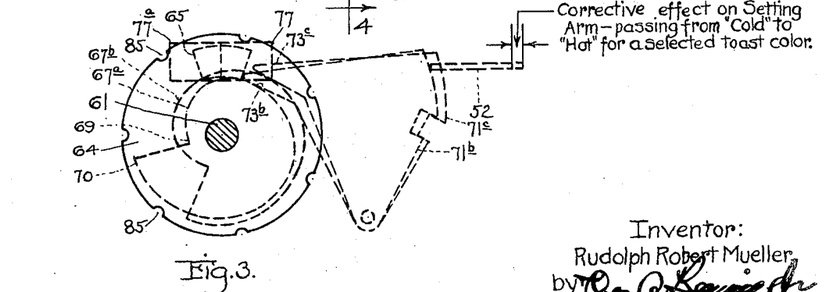
Figure 3 shows somewhat schematically the relation between the colorgraph plate, the cam, the follower plate, and the window selector plate; and this figure shows how, for giving indication of a selected color or shade with the window plate in "cold" position, the cam plate and the follower plate must be in a different position from the positions which these parts should occupy when the window selector plate is moved to its position for "hot" toaster, with a corresponding difference in the position of the follower plate which limits the setting movement of the timer arm.
Figure 6:
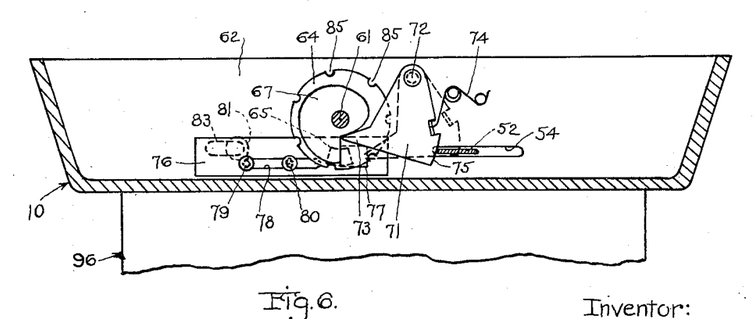
Figure 6 shows a cross-section taken on the line 6—6 of Figure 5, looking in the direction of the arrows.

The back face of this disk (or the stud 61) carries the cam plate 67, the edge of which cam is so formed as to provide a cam element of specifications to meet the requirements presently to be explained. At this point it will be noted that when viewing this cam from the front of the toaster (that is, in the direction of Figure 1) said cam is provided with a radial portion 68 which joins the small radius end of the cam, 69, and the large radius end of said cam 70; and it will also be seen that as the stud 61, finger piece 63, and plate 64 and cam 67 are rotated in the counterclockwise direction (when viewed as in Figure 1) the radius of the cam at a given stationary location increases for the complete cam rotation. Adjacent to this cam, and pivotally connected to the flange 62 of the base section, there is a follower plate 71, such pivotal point being shown at 72. The left hand portion of this follower plate is provided with a finger 73 which overlies the cam surface or edge, the lower and adjacent portion of this follower plate being relieved as shown in Figures 2 and 3 so that said portions of the follower plate do not interfere with its rocking movement as dictated by the form of the cam edge. Examination of said figures will show that the finger 73 lies down onto the upper portion of the cam edge, and that the rocked position of the follower plate 71 is determined by the radius of the cam edge at such position of engagement. At the commencement of rotation of the stud shaft 61 (and cam 67) the finger 73 lies against the small radius portion of the cam, and the point of said finger will limit movement of the cam for rotation clockwise. However said cam can rock or rotate counterclockwise, and as such movement occurs the engaged radius increases, with the result that the follower plate is compelled to rock towards the right, and the extreme amount of such rocking movement is shown in Figure 2 by the dotted line position of the follower plate, 71a. A light spring 74 is provided for retaining the follower plate firmly in engagement with the cam (see Figure 6).

This follower plate 71 is provided with a curved or arcuate right-hand edge portion 75, it being understood that said follower plate overlies the slot 54 through which the setter arm 52 extends. This follower plate occupies a position at the left-hand end portion of said slot, and the curved portion 75 of the follower plate overlies the slot and closes the left-hand end portion of said slot to an extent dictated by the amount of swing of the follower plate caused by the point of engagement of the finger 73 with the cam edge. Thus, by rotating the stud shaft 61 substantially one revolution from its position of the full line showing of the follower plate in Figure 2, to bring the follower plate to the dotted line position of that figure, a substantial portion of the left-hand end of the slot 54 has been overlaid by the follower plate. Consequently, during the leftward movement of the arm 52 and finger piece 55 during the initial setting of the toaster, the point at which such movement will be stopped by the follower plate will depend on the position of the cam 67 as pre-set by the finger piece 63 on the stud-shaft. It will also now be seen that rotation of said finger piece counterclockwise reduces the time interval of the timer since the travel of the arm 52 is accordingly reduced. A contrary condition is produced by rotation of the finger piece in clockwise direction, the timing interval being thereby increased. Accordingly, I have shown, on the visible face of the flange 62 of the base section the indicia "L" and "D" at the left-hand and the right-hand sides of the window opening 65, corresponding, respectively, to "Lighter" and "Darker" as designations for the darkness of the toast to be produced. These designations are correct as it will be seen that rotation of the finger piece towards the left (counterclockwise) results in increase of the cam radius which will engage the follower plate, with rock of that plate towards the right and limitation of setting movement of the arm 52 earlier than would otherwise be the case; and a contrary condition necessarily obtains for rotation of the finger piece to the right (clockwise).

It will now be seen that I have provided a very simple and positive and effective means to predetermine the amount of setting movement of the finger piece, and timer. It will also be seen that by properly forming the cam the arrangement can be made such that specified amounts of rotation of the finger piece, and the stud shaft and the disk will correspond to selected or specified variations in the time of toasting, or specified variations in degree of darkness of the produced toast. The foregoing formation of the cam may be related to the provision of uniform segments of the disk surface 66 colored or shaded with successively or progressively darker shades, to correspond to such successively darker toast products produced by corresponding settings of the parts. In Figures 2 and 3 I have shown the disk surface 66 provided with seven segments of equal arcuate embracements, and shaded with progressively darker shades. I have also shown these segments as provided with numerals corresponding to such shadings or such toast shades. Evidently the portion of the surface 66 disclosed through the window opening 65 is an indication of the toast shade which will be produced with the cam in corresponding position. It is, however, now to be disclosed how I have made provision for ensuring that the selected shade of toast will be produced for either the "cold" or the "hot" toaster condition.

I have provided a window selector plate 76 between the front face of the disk (66) and the flange plate 62 of the base section. This selector plate is provided with an opening 77 through which a portion of the surface of the disk will be exposed, being a portion of the disk exposure permitted by the form and size of the window opening 65. In other words, the selector plate 76 may be shifted to control that portion of the disk which shall be visible through the window opening. To this end the plate 76 is mounted for sliding movement along the inner face of the flange 62, such sliding movement being sufficient to change the showing of the indicia visible through the window opening by an amount corresponding to the change required due to difference in toasting time for production of a selected darkness of toast with either a "cold" start or a "hot" start of the toaster. The plate 76 is provided with the slot 78 by which the slide is supported on the two pins 79 and 80 of the flange 62 with a clearance sufficient to permit that amount of slide movement needed for the desired function as outlined above. A finger piece 81 is carried by a pin 82 which extends through a slot 83 formed in the flange 62, said pin 82 being connected to the slide plate 76. By this arrangement the slide plate can be moved back and forth a distance permitted by the clearance of said slot 78 as compared to the spacing between the pins 79 and 80. Correspondingly the opening 77 of this slide plate will be shifted with respect to the vertical radius extending through the disk 64 and its surface 66. The arrangement is so made that when the slide plate 76 is in either extreme of its movement one or the other of its end edges will align with the aforesaid radial line through the axis of the disk 64. Thus, in Figure 2 the slide plate is shown at its extreme right-hand limit of travel, and there its left hand edge of the opening 77 is seen to register with the vertical radius of the disk 64. In this position the slide plate opening 77 permits vision of the surface 66 of the disk only through the right-hand half of the window opening 65, the left-hand half of such window opening, while being itself visible (since the slide plate is behind the flange 62) is ineffective to give vision of the left-hand portion of the disk surface 66; that is, only that portion of the disk registering with the right-hand half of the window opening 65 is then visible as thus limited by the slide plate 76. On the other hand, when the slide plate is shifted to its opposite extreme of movement (that is, to its extreme left-hand limit to bring its right-hand end of the opening 77 into alignment with the vertical radius of the disk), only that portion of the disk 64 and surface 66 lying to the left of the vertical radius line and registering with the window opening 65 will be visible.

By means of the foregoing combination of the horizontally shiftable slide plate and fixed position window opening, together with the movable colorgraph disk (rotatable) it is possible to give indications for either the "hot" or the "cold" condition. Let it be assumed that a selected shade of toast is desired, and that the toaster is started cold. The finger piece 81 will be set to the right-hand position, as shown in Figure 1, thus exposing the right-hand half of the portion of the disk face 66 registering with the window 65. By then turning the finger piece 63 and stud shaft, disk, etc., the selected shade shown on the face of that disk may be brought into view through the half of the window then exposed, and by bringing the left-hand edge of such selected shade portion to the left-hand edge of the exposed portion of the window (being the vertical radial line), the cam 67 will have been set to correct position for production of toast of the selected shade, under the condition that the toaster is started cold. It will be noted that under the condition specified above the cam will occupy a position such as shown at 67ª in Figure 3, and the follower plate will then occupy a position such as shown at 71b in that figure. Accordingly, the setter arm 52 will have to be moved to the left a distance to engage the follower plate in such setting of said plate, and the timing of the timer will be established to corresponding time interval.

Upon completion of this first toasting operation, and assuming that the toaster has become heated to its normal amount, then prior to commencement of the next toasting operation the finger piece 81 will be set over to the left (see Figure 1) to the "Hot" position, correspondingly moving the slide plate 76 to carry the opening 77 thereof leftwardly until the right-hand edge of said opening registers with the vertical radial line of the disk 64. Such position of the opening 77 is shown at 77a in Figure 3. Under these conditions the showing of the face 66 of the disk 64 will have been disturbed, and the finger piece 63 should now be rotated to the left (counter-clockwise) to bring the right-hand edge of the selected color shade segment of said disk into registry with the right-hand edge of the opening 77 as thus shifted (being the position 77a already referred to). This re-setting of the finger piece 63 will cause the cam 67 to assume a new position as shown at 67b in Figure 3, and this will cause the follower plate 71 to rock slightly towards the right to a new position 71c in Figure 3, thus closing more of the left-hand end portion of the slot 54. Therefore, when the finger piece 55 of the setter arm 52 is now moved leftwardly until stopped by the follower plate, and to commence the next toasting operation, such stoppage of the setter arm will occur at a position more to the right than the previous stopping position, so this subsequent toasting operation will not continue for as long an interval as the first or cold operation. This is as it should be, since when the toaster body has become heated the interval required for production of toast of a selected degree of darkness will be less than the interval required to produce that darkness when starting cold.

Evidently the form of the cam 67 must be so related to the arcuate embracements of the successive showings on the face 66 of the disk, and to the timer arm 52, and to the heating characteristics of the entire toaster that when thus re-setting the finger piece 63 correct compensation will be produced in the timing effect, and so as to produce toast of the same degree of darkness when starting with a hot toaster instead of a cold toaster as originally. It will also be seen that with this arrangement it is not necessary to provide any form of thermostatic control for securing the desired compensation of the timing interval, and that complete reliance is placed on a manual re-setting of the finger piece 63 and the cam, etc., to a new position as indicated by the re-setting of the finger piece 81 from "Cold" to "Hot" position.

Figures 7, 13:
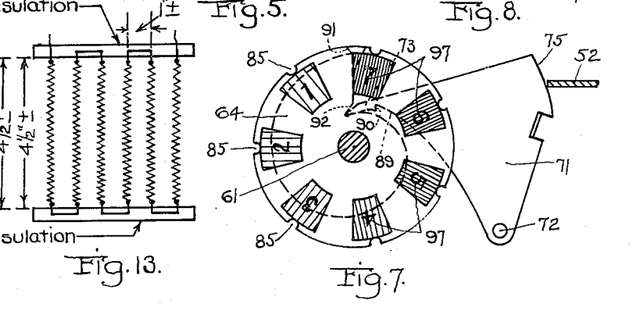
Figure 7 shows on enlarged scale a direct face view of the indicator disk of the arrangement shown in Figures 1 to 6, inclusive, and it shows by the degrees of shading of the successive segments of said disk how the darkness of the toast which will be produced for different disk settings may be indicated; and this figure also shows numerical indicia on the various disk segments to also indicate the degrees of darkness of toast which will be produced for various indicator settings; and this figure also shows one simple means for preventing over-running of the selector shaft and disk by provision of limit stops for limiting rotational movement in both directions.
Figure 13 shows a modified heating element arrangement in which the passes of the heating element wires lie parallel to each other instead of in zig-zag form as in Figure 12.

Reference to Figure 7 in particular, in which the front face of the indicator disk is more clearly shown than in Figures 2 and 3, will show that between the colorgraph segments of successive degrees of darkness there are shown the blank spaces 84 which are of substantially the same arcuate embracements as the proximate shaded segments. It is furthermore seen that while there are provided in said Figure 7 successive degrees of shadings, corresponding to 7 degrees of toast darkness, each of these 7 shaded segments embraces substantially 1/14 of the total circle, the intermediate blank segments also being of equal embracements. Also, the window opening which will be exposed for either setting of the slide plate 76 (hot or cold) is of size to expose a segment of the disk of approximately 1/14 of the entire circle of that disk. Thus, when the slide plate is moved from one position to the other, changing from "Cold" to "Hot" or vice versa, the showing of the indicator disk will become a blank without shading; and then, by rocking the button 63 by 1/14 of a complete rotation the same shade segment of the indicating disk will again be brought into view through the window, and the setting will be complete for production of toast of the same degree of darkness as previously, but for the new setting of the button 81.

If desired an interconnection may be provided between the rotary disk indicating element and the slide plate so that the movements needed for changing setting from cold to hot or vice versa, for a given degree of darkness may be simplified. To this end I have shown, in Figures 2, 3, 6 and 7 the notches 85 equally spaced around the edge of the disk 64, and the leaf spring element 86 having its end 87 secured to the slide plate, and its end 88 provided with a catch which may ride down into each of the notches 85 in turn as relative rotation occurs between the disk and the slide plate. With this arrangement, by turning the button 63 to bring the desired degree of darkness into view through the window, and moving said button 63 sufficiently to cause the spring end 88 to snap into the corresponding notch 85, a slight locking of the slide plate and the indicator disk will be caused, sufficient to ensure that said indicator plate will follow the movements of the slide plate which may occur between the limits of such movement as dictated by the ends of the slotted opening 83. Therefore, with the disk 64 thus set to show the desired degree of darkness the button 81 may then be moved laterally in one direction or the other, if necessary to bring said button 81 to indicate either the cold or the hot condition as needed. If such lateral movement of said button 81 is thus needed the indicator disk will follow such movement to maintain the showing of the pre-selected degree of darkness to which said disk had been set. Afterwards, if it is desired to select a different degree of darkness the button 63 may be forced, against the holding of the leaf spring element 86, to release said spring from the previously engaged notch, allowing the disk to be then turned sufficiently far to bring the new darkness indication into view, at which position the spring will engage the corresponding notch 85 for a function similar to that already explained in case of a re-setting of the cold-hot indicator for the new darkness indication. Of course, if during such movements as just described it is necessary to pass any intermediate notches, the spring end 88 will snap through such intermediate notches with a slight hesitation at the position of each such intermediate notch.

It will be noted that in the absence of special provision the rock shaft 61, indicator plate, cam, button 63, etc., could be continuously rotated for more than one complete revolution, in the counterclockwise direction. Rotation in the clockwise direction is limited by engagement of the radial edge 68 of the cam against the end of the finger 73 of the follower plate. Reference to Figure 7 shows that the end portion of the finger 73 of the swinging follower plate is provided with a relieve 89 on its under face to provide the hook end 90 facing towards the right in said figure. The edge of the cam element is provided with a reversely facing outwardly extending shoulder 91 which will engage the hook 90 of the finger 73 at completion of rotation of the shaft 61 in the counterclockwise direction, thus ensuring proper limitation of rotation in that direction. If desired, said radial edge of the cam may also be provided with a notch 92 at the small radius end of said radial portion, so that at completion of rotation of the shaft 61 in the clockwise direction the end of the finger 73 will engage into this notch 92, and thus prevent any possible over-ride in the clockwise direction. In this connection it is noted that the pivotal point 72 lies considerably below the horizontal line passing through the axis of the rock shaft, so that when the radial edge of the cam engages the end of the finger 73 there is produced a turning moment on the follower plate in the clockwise direction. This turning moment will be resisted by engagement of the end of the finger with the notch.

Reference has been made to the fact that there are intermediate blank spaces 84 between the successive shaded segments of the indicator disk as shown in Figure 7, and that these blank spaces 84 are of substantially the same arcuate embracement as the shaded segments themselves. In Figure 8 I have shown a modified arrangement of indicator disk and window arrangement which embodies certain of the features already disclosed. In this case however the window opening is shown by the dotted lines 93 in Figure 8, and said window opening may be of fixed location and size and contour. In the showing of this figure each of the intermediate blank spaces or segments is shown as being shaded with the same degree of darkness as its adjacent companion segment, so that there are provided the two adjacent segments, both of the same degree of darkness of shading, and both of approximately the same arcuate embracement as the fixed window. One of these segments is also provided with the mark "C" and the other with the mark "H," as clearly shown in Figure 8. Thus, for a selected darkness either the cold or the hot position of the indicator disk may be brought into registry with the fixed window opening. The two segments, for example "7C" and "7H," may be separated by a radial line as shown at 94 so as to ensure correct setting of the disk for either of the settings, cold or hot. The cam element for this modified form of indicator disk is shown by the dotted lines 95 in Figure 8. This cam element is of course of such form that in passing from a cold to a hot indication, or vice versa, there will be produced a correct amount of re-setting of the follower plate to correspond to the difference between toasting times for the cold and the hot condition.

With the form of indicator disk and window arrangement shown in Figure 8 it is not necessary to provide any movable shutter or slide plate such as the slide plate 76 of Figures 2, 4, 5 and 6 in order to provide for selection of the "cold" and "hot" timing intervals for production of toast of selected color.

I have stated that the timer element 42 is of such form and construction that the rock arm 43 normally stands at its discharged or initial position, such as shown in Figure 5. Also, that by rocking this arm in counterclockwise direction the timer is "set" so that by then releasing the arm 43 the timer commences its "discharge," the arm 43 slowly rocking back in clockwise direction until its initial position is reached, at which time the arm 44 is released, and the contacts 40 and 41 become separated to open the heater element circuit. I have also stated that the time count which will elapse during the returning rock of the arm 43 to its initial position depends on the angular extent of movement originally imparted to this arm in the original setting of the timer.

This timer is also provided with clutch means such that after the arm 43 has been set for a timing operation said arm can, if desired, be manually moved back to its original or initial position without waiting for completion of the time count which would otherwise have been made, so that the opening of the contacts 40 and 41 may be caused to anticipate the normal time count interval for the setting to which the arm 43 was set by the arm 52. In other words, if desired, the toasting operation may be shortened at any time, and may be terminated at any time by merely forcing the arm 52 to return to its initial position by pressing the button 55 towards the right when viewed as in Figure 1. Such manual termination of the toasting operation may be desirable in case it is decided to deliver the toast at a lighter color than had been originally intended, or for other reasons.

The housing, when provided, is shown at 96 (see Figure 1 in particular), said housing enclosing the slice carriers, the heating elements, and other parts directly related thereto. By forming this housing or enclosure of plastic or glass or other transparent material, the toasting operations proceeding within such enclosure may be observed without hindrance, and thus the progress of the operation may be known at all times, and regardless of the indication shown by the position of the colorgraph or chart or disk. Such fully transparent form of enclosures is disclosed in my aforesaid co-pending applications, and need not therefore be fully described herein.

However, at this point I wish to emphasize the fact that I have combined such fully transparent enclosure arrangement with the timer arrangement in which the toasting operation may be manually terminated at any time by the operator by merely forcing the arm 52 and button 55 towards the right in Figure 1 as I have already pointed out. Thus, with this combined arrangement, the operator may pre-set the button 63 for the desired darkness of toast to be produced, and then he may allow the operation to proceed automatically to completion, at which time the toasted slices will be delivered at the pre-selected degree of darkness; or at any time prior to such automatic discharge he may, after observation of the darkness of toast then attained, cause termination of the operation, and delivery of the toast at such lighter shade as he may wish. Other manners of operation will also suggest themselves to the user of this combination.

In Figures 7 and 8 in particular I have shown the shaded segments of the indicator disk as being provided with the numerical indicia 97 to which reference has already been made.

Figure 9:
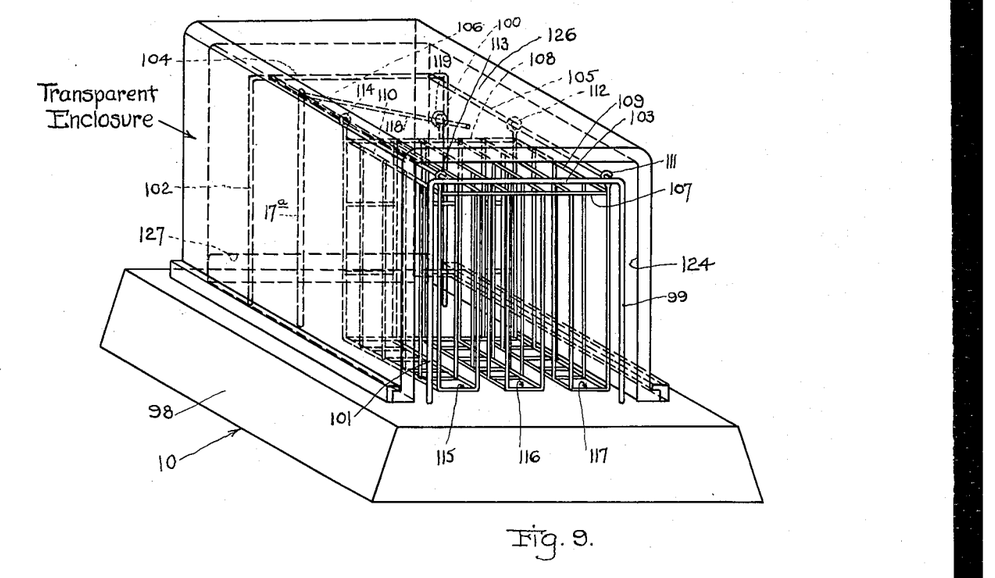
Figure 9 shows in perspective a modified form of toaster embodying features of my present invention, and in which the horizontally movable slice carriers are arranged to carry the slices in vertical planar position instead of in horizontal planar position, the toaster shown in this figure being provided with a transparent enclosure, and with various of the other inventive features herein disclosed.
Figure 10:
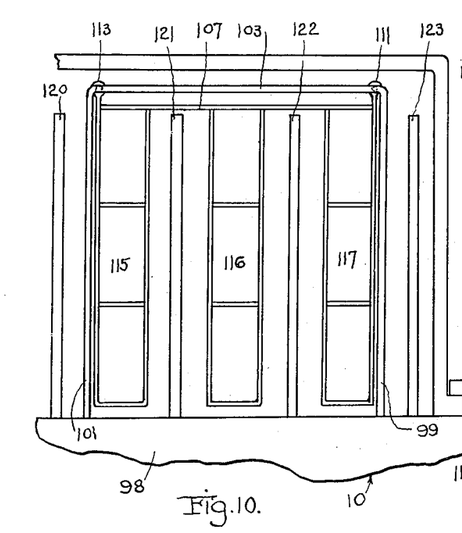
Figure 10 shows a front elevation of the toaster of Figure 9, a portion of the structure being broken away to make the figure smaller, and the heating elements and other parts being shown more or less schematically.
Figure 11:
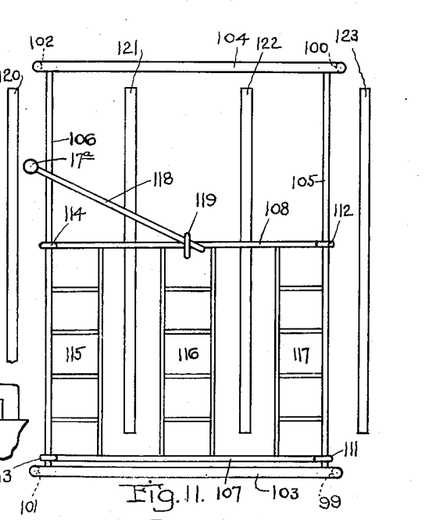
Figure 11 shows a fragmentary horizontal section of the toaster shown in Figures 9 and 10, the slice carriers being shown in their delivery position, for which purpose the rock shaft and arm being correspondingly rocked.
Figure 12:
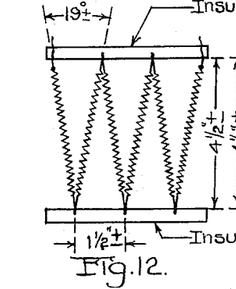
Figure 12 shows on reduced scale a fragmentary horizontal section taken on the line 12—12 of Figure 1, looking in the direction of the arrows; and it shows a zig-zag form of the heating element wires.

In Figures 9, 10 and 11 I have shown another modified form of toaster in which the slice carriers are supported and moved in horizontal fashion between the toasting and discharge positions, or vice versa, but in this embodiment of the invention the slices are supported in vertical fashion instead of in horizontal planes. In this case there is provided the base section 98 from which there extends the light framework including the wire corner posts 99, 100, 101 and 102 whose upper ends are joined into a stiff rectangular frame by the horizontal wire elements 103 and 104 which extend across the width of the frame, and 105 and 106 which extend lengthwise of the frame, and constitute rails on which the slice carrier is supported and moves. The slice carrier includes the upper rectangular wire section having the front and back wires 107 and 108, and the side wires 109 and 110. The four loops 111, 112, 113 and 114 extend upwardly from this carrier frame and ride on the rails 105 and 106, so that the carrier is permitted sufficient forward and backward movement to thus meet the requirements of the operations.

Downwardly extending from this carrier frame are the slice cages or compartments 115, 116 and 117 of such number as may be desired. In the toaster shown in Figures 9, 10 and 11 I have chosen to show three such slice carriers, but of course this number might be either smaller or greater than three as desired. Each of these cages is formed of light but sufficiently stiff wires, and simple forms of such cages are shown in the figures. It will be noted however that each cage is open at its front face, and at its back face is provided with one or more intersecting wires so that the slices cannot move out from the cages backwardly.

There is provided the vertical rock shaft 17ᵃ having its lower end journalled in the base section, and which rock shaft corresponds to the rock shaft 17 of the form of toaster shown in Figures 1 and 5 already described. This rock shaft is controlled by a spring and by a timer in the base section in manner similar to that already described in full detail; and it is therefore deemed unnecessary to make full illustration and description of these details in connection with Figures 9, 10 and 11. This rock shaft carries the finger 118 which engages a loop 119 extending upwardly from the carrier frame, so that the forward and backward movements of the carrier are properly executed by rocking of the shaft in clockwise and counterclockwise directions between the proper limits of such movements. Between the cages, and adjacent to the outside faces of the extreme cages are the heating elements shown schematically at 120, 121, 122 and 123. The details of these heating elements need not be disclosed here as they may be of any suitable form and characteristics to meet the requirements of the particular toaster design.

Upon completion of a toasting operation with the form of device shown in Figures 9, 10 and 11 the rock shaft 17ᵃ is suddenly rocked clockwise (viewed as in Figure 11), thus suddenly projecting the slice carrier forwardly, and by a sudden stop of such slice carrier the toasted slices will be delivered in manner corresponding to such stoppage.

It will now be seen that I have illustrated and described embodiments of my invention in which the slices are moved by horizontal movements between their toasting and delivery positions or vice versa, and in which the slices may be supported, during the toasting operation, either in horizontal planes, or in vertical planes.

I wish to point out that the heating elements 31, 32 and 33 of the form of toaster shown in Figures 1 to 8, and the heating elements 120, 121, 122 and 123 of the form of toaster shown in Figures 9, 10 and 11 are preferably of the open wire type, that is, the type in which the heat producing resistance elements comprise resistance wires strung back and forth between suitable insulating supports, so that the toasting surfaces can be readily seen through these heating elements, if desired. Thus, in Figure 1 the operator can view the toasting operation through the transparent enclosure 96, and, if need be, he can also look downwardly in a slanting or vertical direction, and through portions of the heating elements, to observe the horizontal toasting surface during the progress of the toasting operation. Or, when using a form of toaster such as that shown in Figures 9, 10 and 11, the operator can look horizontally through the transparent enclosure and, if need be, he can also look through the heating elements themselves to observe the toasting surfaces, and thus follow the toasting operation.

It will be understood that in the form of toaster shown in Figure 1 the enclosure opening is at the right-hand side of the enclosure as shown at 124 in that figure. The enclosure is provided with the vertical walls parallel to the surface of Figure 1, and with the back wall 125, and the top 126. Preferably the opening 124 is provided by eliminating the complete wall at that side of the enclosure, but the size of said opening may be less than such full size, provided only that the size of such opening be sufficient to permit the slices to be inserted and removed through such opening. This opening is thus of such size that considerable venting and movement of atmosphere through such opening will occur during the toasting operation, fresh air entering through the lower portion of such large opening, and flowing upwardly within the interior of the enclosure, and being delivered out through the upper portion of such opening. Such natural air movement will carry with it the vaporized moisture from the slice or slices as fast as vaporization occurs, so that the resulting toast will possess the desirable qualities hereinbefore explained.

However, in order to enhance the circulation of air into and through the enclosure I prefer to provide a further opening in such enclosure, and preferably in that vertical wall opposite to the opening 124. To this end I have shown, in Figure 1, the slotted opening 127 along the lower edge of the wall or end 125. This slotted opening 127 is conveniently provided by forming the wall 125 with an elongated notch or relieve extending substantially the entire horizontal dimension of that wall, so that when the enclosure unit is set into place on the base section this notch will provide the desired elongated opening just above the top surface of the base section. By this arrangement an opening of desired size is provided opposite to the opening 124, and at the lowest possible level. Air will then enter through this opening, and due to the heated condition of the unit this air will flow upwardly and towards the opening 124, being baffled during such flow by the presence of the horizontally extending slices, and flowing around and over and through the various heating elements. This current of air will finally find its way to the opening 124, and will discharge continuously through such opening during the entire toasting operation.

The heat striking any given surface of a toast slice will include both direct radiant heat and reflected heat from adjacent reflecting surfaces. There is also heat carried to the toast surfaces by convection, that is, bodily displacement of the heated atmosphere from the heating elements or other hot surfaces to the toast slice surfaces. By proper spacing of the heating elements with respect to the slice carriers, proper selection of the reflecting surfaces, and selection of proper heating elements, uniform toasting of all slice surfaces is produced, and the rates of toasting of all surfaces are made substantially equal. Thus at termination of the timed interval all of the slice surfaces are toasted to substantially the same darkness.

The vaporized moisture from the slices will be carried away by convection, that is, bodily movement of the atmosphere past and over the slice surfaces. This may be called "convective turbulence," and it depends primarily on the current of atmosphere flowing through the enclosure from the opening 127 to the opening 124 as already explained.

Due to the fact that the vaporized moisture from the slices is continually carried away by the curent of atmosphere, there is substantially no deposit of either moisture or other matter on the inside surfaces of the enclosure. For this reason the clarity of all walls of the enclosure is unimpaired even after a large number of toasting operations, and the transparency of the enclosure remains unimpaired. The desired visibility of the interior of the toaster therefore remains high even after a long interval of time, and after many operations.

While in Figures 1 and 9 I have shown the elongated low level opening or slot 127 for inlet of air into the enclosure for flow through said enclosure and discharge through the opening 124, and have shown said opening 127 as being formed as a notch or relieve in the enclosure wall 125 it is evident that other forms of inlet opening, and other locations thereof, may be used, either in place of said opening 127 or supplemental thereto. For example, if desired the enclosure wall 125 might be carried down to the level of the top surface of the base section 10, and said base section itself might be provided with a downwardly extending groove or elongated recess so as to establish an opening between the lower edge of the enclosure wall 125 and the base section; or an opening or openings may be provided extending through or adjacent to one or both of the side walls of the enclosure so as to allow lateral wall inlet into the lower portion of the interior of the enclosure; or there might be provided various combinations of low level inlet openings in the enclosure wall 125 and the side walls of the enclosure. Broadly I contemplate low level inlet of fresh air into the lower portion of the interior of the enclosure, either through the lower portion of the main opening 124 or through a supplemental low level opening or openings, or a combination of low level openings variously located; together with continuous discharge of the heated atmosphere (and vapors) from the interior of the enclosure through a higher level opening or openings, such as through the upper portion of the main opening 124.

I wish to emphasize the fact that the heating elements (such as 31, 32, and 33) are of the open wire type and that they are not enclosed or segregated from the space of the interior of the enclosure by any partitions such as mica or other sheets. Due to these facts complete freedom of movement of the atmosphere within the enclosure is permitted around and through and past said heating elements so that complete freedom of atmospheric convection to and from the toasting slices is assured.

Furthermore these heating elements comprise passes of the heating wires between the insulating supports carried by the bars 34, 35, and 36 in the front portion of the interior of the enclosure, and the insulating supports carried by the bars 37, 38, and 39 in the rear portion of the interior of the enclosure. These passes of heating wires may be connected in suitable manner, as for example, in series with each other, or in series-parallel, or in parallel. Furthermore, said passes may be either parallel to each other (that is, directly parallel to the axis of the toaster in a selected direction), in which case they will be strung in what may be called "square directional stringing"; or said passes may be so arranged as to provide what may be called V directional stringing; or other stringing arrangements may be used as selected by the designer.

These heating elements, when heated by the electric current, become red hot, but by properly spacing said heating elements with respect to each other it is possible to ensure proper toasting of the proximate slice surfaces while at the same time avoiding what may be called a "flame wall" through which visibility would not be possible, or which "flame wall" would so impair visibility as to prevent dependable and accurate inspection of the toasting surfaces (through the material of the transparent enclosure 96 and between the passes of the heating element). But, in the case of a toaster of the form shown in Figure 1 the observer can look down through the top of the transparent enclosure, and between the passes of the heating element 33, and observe the toasted condition of the slice carried by the carrier 16 of that figure. Or, in the case of such a toaster as that shown in Figure 1 the observer can look through a side wall of the transparent enclosure 96 (either horizontally or at an angle to the horizontal), and between or past the passes of the heating elements to observe the toasted condition of the upper and lower slice surfaces of the slices carried by the carriers 15 and 16. Similar explanations might be made with respect to the form of toaster shown in Figures 9, 10 and 11, but with proper corrections of directions of vision due to the fact that in the toaster arrangement of those figures the slices are supported in vertical planes instead of in horizontal planes.

As typical of one practical embodiment of the heating elements such as 31, 32, and 33 I may mention a toaster built according to the teachings of the present application and in which the wires of said heating elements are strung back and forth between the insulating elements carried by the bars 34—37, 35—38, and 36—39 in zig-zag manner to produce V-shaped openings between successive passes of each heating element. With this arrangement, and with a distance of approximately 4½ inches between the bars 36 and 39 by way of example, the zig-zags may be produced by locating the successive points of heating wire support approximately 1½ inches apart, thus creating V-shaped openings between successive passes, and with adjoining wire passes lying at an angle of substantially 19 degrees to each other. Another example of the formation of said heating elements would be one in which the successive passes are located parallel to each other and separated from each other by a distance of substantially 1 inch.

The foregoing illustrations are given merely by way of illustration, and not in any sense as a limitation on the protection to be afforded to me by the present application, except as I may limit myself in the claims to follow.

It is to be noted that when the toaster has been in operation for a sufficient interval of time the metal, glass, and other parts, become heated, and they retain their heat for a considerable interval of time, irrespective of the fact that atmosphere is being delivered from the enclosure. These metal and glass and other solid parts have a definite heat absorbing and retaining capacity based on their several masses and their several specific heats. Thus it is possible to definitely calibrate the timing operations for "cold" and "hot" conditions, to produce toast to pre-selected specifications, and on the basis of a fixed time interval differential as between the time for producing such specified toast when starting "cold" as compared to the time to produce such specified toast when starting "hot." The devices herein disclosed include operation on that principle.

I claim:

1. The combination with the timer of a toaster, said timer including a longitudinally reciprocable setting element movable along a path of travel in one direction during timer timing operation to a zero position and movable in the opposite direction from said zero position during presetting operation of the timer, the duration of the timing operation during timing movement to the zero position in the first mentioned direction corresponding to the amount of pre-setting movement from the zero position in the second mentioned direction during the pre-setting operation, means to predetermine the amount of said presetting movement comprising a cam plate, means to journal said cam plate for rotation about an axis substantially normal to the path of travel of the setting element, said cam plate being provided with an arresting surface of regularly increasing radius measured from the axis of rotation, and extending from a point of minimum radius of said surface to a point of maximum radius of said surface, a part in conjunction with the setting element adapted to engage said arresting surface of the cam plate at locations of varying radii of said arresting surface corresponding to successive rotated positions of the cam plate, the movement of the setting element from the zero position thereof during the presetting operation being limited by the location of engagement of the aforesaid part with said arresting surface corresponding to the rotated position of the cam plate to thereby also limit the amount of pre-setting movement of the setting element from the zero position, indicia in conjunction with said cam plate and movable angularly with the cam plate and located at various angular positions about the axis of rotation of said cam plate, said indicia designating various degrees of toasting operation corresponding to various rotated positions of the cam plate, and means to indicate to the observer the successive indicia as the cam plate is rotated, to thereby define the toasting operation corresponding to each selected rotated position of the cam plate.

2. Means as specified in claim 1 wherein said indicia comprise visual identifications located at successive angular positions around the axis of rotation, and wherein said indicating means comprises an orifice with which the indicia register in succession during rotation of the cam plate and indicia, to thereby define and identify the indicia corresponding to the succesive rotated positions of the cam plate.

3. Means as specified in claim 1 wherein said part in conjunction with the setting element and adapted to engage said arresting surface of the cam plate comprises a rockable element pivoted for rocking movement on an axis located between the axis of rotation of the cam plate and the zero position, said rockable element including a finger lying in engagement with the arresting surface of the cam plate and movable to successive positions corresponding to successive radii of engagement of said finger with said arresting surface to thereby determine the rocked position of said rockable element, and wherein said rockable element includes a surfaced portion facing towards the setting element and adapted for engagement by said setting element during setting operation to thereby limit the setting movement of the setting element.

4. Means as specified in claim 1 wherein said predeterming setting means includes means to predetermine presetting positions of the setting element corresponding to various degrees of toasting operation for either "cold" or "hot" starting condition of the toaster and wherein the duration of the timing operation for cold starting condition is longer than the duration of the timing operation for hot starting condition, and wherein the arresting surface of the cam plate is of configuration to cause limitation of movement of the setting element in the setting direction at successively more advanced amouts of setting movement in the setting direction corresponding to setting for "hot" start for each degree of toasting operation followed by "cold" start for such degree of toasting operation, and with the setting position for the "hot" start of each degree of toasting operation located farther from the zero position than the setting position for the "cold" start of the preceding degree of toasting operation, and wherein said means to indicate to the observer the successive indicia includes means to indicate the condition of "cold" start or "hot" start.

5. Means as specified in claim 4 wherein the indicia designating each degree of toasting operation includes two adjacent indicating sections, one for "cold" start and the other for "hot" start, together with a single means to indicate to the observer the indicating section corresponding to the setting position of the cam plate.

6. Means as specified in claim 5 wherein said single means to indicate to the observer the indicating section comprises a single stationary viewing opening with which the indicia successively register during rotary movement of the cam plate.

7. Means as specified in claim 4, together with a manually movable element movable to either of two positions, one being a "cold" start position, and the other being a "hot" start position, engaging means in connection with the cam plate at locations around the cam plate angularly displaced from each other corresponding to the successive degrees of toasting operation, and spring engageable means in connection with the manually movable element adapted to successively engage said cam plate engaging means at the positions of the successive degrees of toasting operation, whereby when said spring engageable means is in engagement with a selected engaging means of the cam plate the cam plate and the manually movable element move in harmony between the two positions of the manually movable element, the movement of the manually movable element between said two positions of said element corresponding to cam plate movement between the "cold" and "hot" start positions of the cam plate for a selected degree of toasting operation.

8. Means as specified in claim 7 wherein the means to indicate to the observer the successive indicia and the means to indicate the condition of "cold" start and "hot" start includes a window opening through which said indicia are visible to the observer.

RUDOLPH ROBERT MUELLER.

REFERENCES CITED

The following references are of record in the file of this patent:

UNITED STATES PATENTS

| Number | Name | Date |
|---|---|---|
| 1,522,818 | Grouleff et al. | Jan. 13, 1925 |
| 1,560,578 | Hummel et al. | Nov. 10, 1925 |
| 1,971,058 | Walder | Aug. 21, 1934 |
| 2,056,400 | Holtz | Oct. 6, 1936 |
| 2,088,499 | Warner | July 27, 1937 |
| 2,101,062 | Graham | Dec. 7, 1937 |
| 2,112,422 | McCullough et al | Mar. 29, 1938 |
| 2,143,692 | Haar | Jan. 10, 1939 |
| 2,152,913 | Padelford et al. | Apr. 4, 1939 |
| 2,257,906 | Gough | Oct. 7, 1941 |
| 2,293,741 | Lucia | Aug. 25, 1942 |
| 2,337,124 | Olving | Dec. 21, 1943 |
| 2,387,586 | Humphreys | Oct. 23, 1945 |
| 2,465,577 | Cox | Mar. 29, 1949 |
| 2,485,456 | Poole | Oct. 18, 1949 |